Patented Nov. 4, 1930

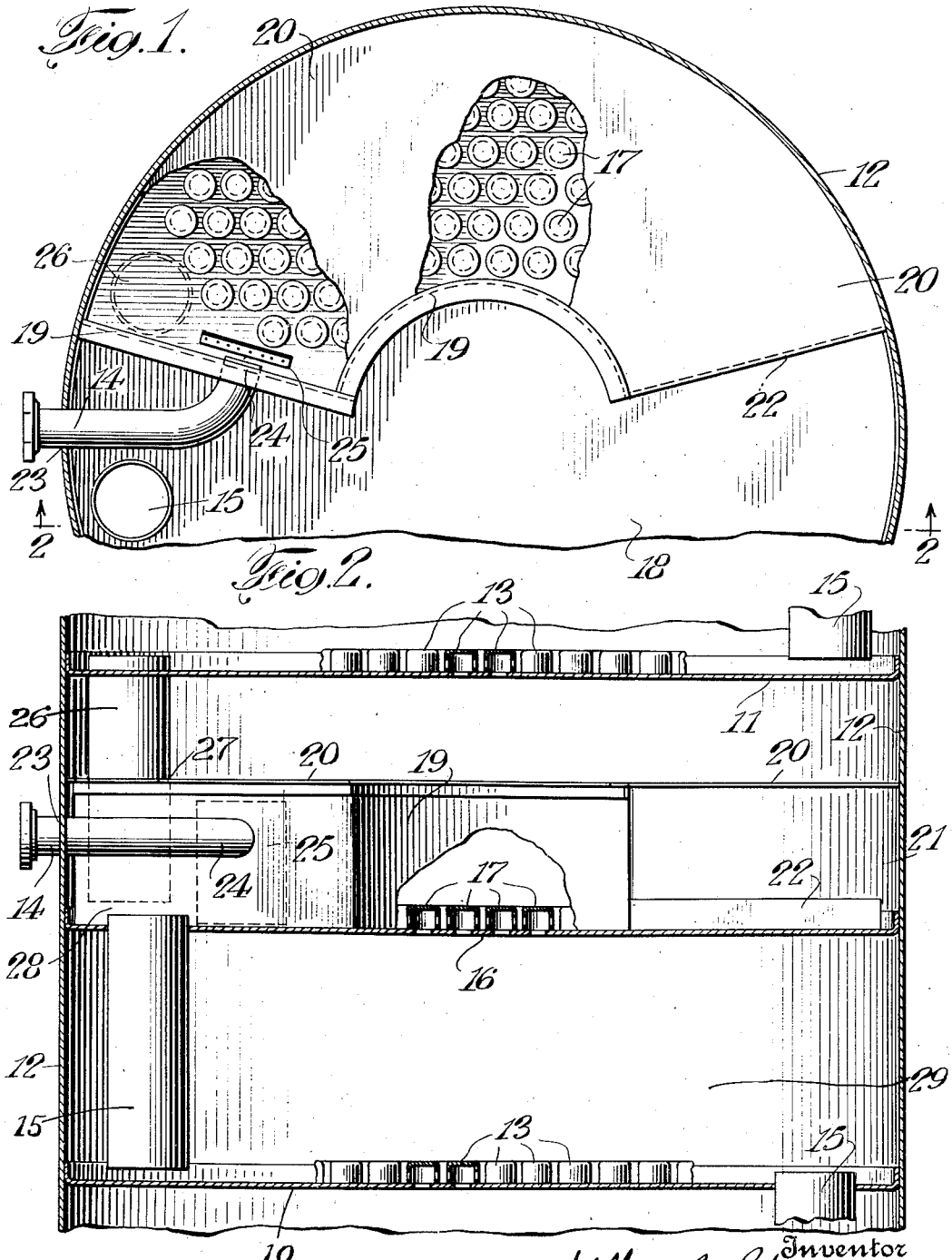

1,780,438

UNITED STATES PATENT OFFICE

WILLIAM A. PETERS, JR., OF SEATTLE, WASHINGTON, ASSIGNOR TO E. B. BADGER & SONS COMPANY, OF BOSTON, MASSACHUSETTS, A CORPORATION OF MASSACHUSETTS

FLUID-MIXING DEVICE

Application filed April 16, 1929. Serial No. 355,486.

This invention relates to improvements in counter current contact devices and in particular to apparatus for mixing a fluid introduced into a fractionating or absorption tower with the liquid and/or vapors therein.

In the ordinary fractionating or absorption tower the fluid, either liquid or vapor or both, is introduced at a plate through which vapors may pass upwards at many points over the entire surface of the plate. In large size units these plates are often of considerable area. The result is that only a small portion of the upwardly flowing vapor comes in contact with the newly introduced fluid, the major portion never having contact with the fresh fluid as it passes up thru the plate.

In the same manner, the newly introduced fluid has contact with only a small portion of the liquid pool on the plate, so that there must be a downward flow over several succeeding plates before a thorough mix is obtained. An inefficient fractionation thus takes place due to the difference in composition of the liquids on the plate and to the extremely limited amount of vapors which come in contact with the fresh fluid.

A primary object of this invention is to eliminate the disadvantages stated above. Other objects and advantages of my invention will be apparent from the following description taken in conjunction with the drawings which are a part of the specification and in which:

Fig. 1 is a portion of a horizontal section taken at the feed inlet plate of a fractionating or absorption tower; and Fig. 2 is a vertical section of a fractionating apparatus showing successive plates or trays, bell-caps, downflow pipes and baffles.

Referring more particularly to the drawings in which like reference characters denote like parts, 10 and 11 denote the ordinary trays or plates of standard type in a fractionating tower having the wall or shell 12. Bell-caps 13 are placed on the plates 10 and 11 in the usual manner. The liquid passes down the tower from plate to plate by means of the downflow lines 15.

The fresh feed is introduced thru the inlet pipe 14 onto the plate or tray 16. This plate 16 is covered only in part by bell-caps 17, the space 18 being left blank. The portion of the plate bearing bell-caps is separated from the blank portion 18 by vertical baffles 19 whose sides have a height of about one half the distance between the trays 16 and 11. A cover 20, shown partly broken away, extends from the shell wall 12 to the vertical baffles 19, forming a hood over the bell-caps 17. At the section 21, Fig. 2, the hood is left open except for a low dam 22 which maintains the liquid level at the proper height around the bell-caps 17 on plate 16. The inlet feed pipe 14 passes thru the shell wall 12 at 23 and then thru vertical baffles 19 into the hood at point 24. The fresh feed from 14 discharges against a baffle 25 which, in connection with the baffles 19 and 20 forming the hood, distributes the liquid over the bell-caps 17.

The liquid from the plate 11 drops to plate 16 thru downflow 26. The downflow pipe 26 passes thru the hood at point 27 and discharges the liquid at 28, Fig. 2, near the discharge of the fresh feed inlet 14. The liquid flows among the bell-caps 17, over the dam 22, across the blank plate 18 to the downflow 15 thru which it drops to plate 10 below.

The operation of the apparatus is as follows:

The vapors passing up the fractionating tower go thru the lower tray 10 and the bell-caps 13. The vapors are mixed with the liquid on plate 10 in passing thru the bell-caps 13 and enter into the vapor space 29. The liquid reaches this plate from plate 16 above by means of the downflow pipe 15. The vapors in passing through the next plate 16 above can pass thru only the relatively small number of segregated bell-caps 17 on plate 16. The fresh feed enters onto plate 16 thru pipe 14, discharges against the baffle 25. The liquid from the plate 11 above is directed by downflow pipe 26 to a point under the hood and near the discharge point of the fresh feed inlet pipe 14. The fresh feed and the liquid from the plate above, discharging onto plate 16 at approximately the same point are forced by the hood to flow thru the enclosed space containing the bell-caps 17 on plate 16. All of the vapors from the plates below pass thru these bell-caps 17. The vapors from plate 16 pass thru opening 21 in the hood and up thru bell-caps 13 on plate 11. The result is that a thorough mixing and churning action takes place in which the fresh feed is completely mixed with the liquid from the plates above and all of this liquid mixture is throughly contacted with all of the vapors passing through plate 16. The liquid after passing over the bell-caps 17 flows over the dam 22 and then passes over the blank plate 18 to the downflow pipe 15 where it drops to plate 10 below.

It can be seen that by using my device to obtain a thorough contact and mixture of fresh feed, tower liquid, and vapors, a more perfect fractionation is brought about. Closer cuts and a greater quantity of a desired product are obtained.

My device, described herein, may be used with any of the fractionation or absorption towers which are commonly known to the art, and the vapor and liquid contacting may, of course, be brought about by any of the well known methods. When several separate streams of fluid are introduced to a tower, my contacting and mixing device may be used, of course, at each point of introduction of fluid. I have described only one specific form of my apparatus. To those skilled in the art, it is obvious that there are possible modifications. For this reason, I do not wish to be limited by this description and drawings but only by the prior art and the appended claims.

I claim:

1. In a vapor and liquid contacting apparatus, a fluid mixing device comprising a fluid inlet means, a liquid inlet means, vapor and liquid contacting means, and a means inclosing said vapor and liquid contacting means and the discharge ends of said fluid inlet means, and said liquid inlet means.

2. In a counter-current fluid contacting apparatus an injected fluid mixing device comprising a fluid inlet means, a reflux inlet pipe, vapor and liquid contacting means, and a means inclosing said vapor and liquid contacting means and the discharge ends of said fluid inlet means, and said reflux inlet pipe.

3. In a counter-current fluid contacting device having a plate, an introduced fluid mixing device comprising a hood open at one point and covering a portion of said plate, an introduced fluid inlet means discharging under said hood, a downflow pipe discharging under said hood and near said introduced fluid inlet, vapor and liquid contacting means under said hood between discharge points of said introduced fluid inlet, said downflow pipe and open portion of said hood.

4. In combination with a fluid contacting device, an introduced fluid mixing means comprising a section through which all fluid in the contacting device must pass, a hood having an outlet, over said section, an introduced fluid inlet means discharging under said hood, a downflow pipe discharging under said hood, and near said introduced fluid inlet means, and vapor and liquid contacting means under said hood between discharge points of said introduced fluid inlet, said downflow pipe and outlet of said hood.

5. In combination with a fluid contacting device, an introduced fluid mixing means comprising a section through which all fluid in the contacting device must pass, a hood having an outlet, over said section, an introduced fluid inlet means discharging under said hood, a downflow pipe discharging under said hood, and near said introduced fluid inlet means, baffling means to distribute discharge from said introduced fluid inlet means, and vapor and liquid contacting means under said hood between discharge points of said introduced fluid inlet, said downflow pipe and outlet of said hood.

6. In combination with a fluid contacting device, an introduced fluid mixing means comprising a section through which all fluid in the contacting device must pass, a hood having an outlet, over said section, an introduced fluid inlet means discharging under said hood, a downflow pipe discharging under said hood and near said introduced fluid inlet means, baffling means to distribute discharge from said introduced fluid inlet means, vapor and liquid contacting means under said hood between discharge points of said introduced fluid inlet, said downflow pipe and outlet from said hood, and a low dam across said outlet portion.

In testimony whereof, I have signed my name to this specification this 15th day of April, 1929.

WILLIAM A. PETERS, Jr.